April 20, 1937.  A. C. LINDGREN  2,077,942

TRACTOR PLOW HITCH

Filed March 15, 1935  3 Sheets-Sheet 1

Inventor
Alexus C. Lindgren
By J. F. Lussagne
Atty.

April 20, 1937. A. C. LINDGREN 2,077,942
TRACTOR PLOW HITCH
Filed March 15, 1935 3 Sheets-Sheet 3

Inventor
Alexus C. Lindgren
By V. F. Lassagne
Atty.

Patented Apr. 20, 1937

2,077,942

UNITED STATES PATENT OFFICE 2,077,942

TRACTOR PLOW HITCH

Alexus C. Lindgren, Chicago, Ill., assignor to International Harvester Company, a corporation of New Jersey Application March 15, 1935, Serial No. 11,313

25 Claims. (Cl. 97—47)

This invention relates to implement hitches for tractors and more particularly to draft connections for plows directly connected to a tractor.

In the directly connected type of plow where the rear furrow wheel partly supports the plow, a long hitch is desirable to prevent side draft of the plow, when it is connected in offset position on the tractor, from interfering with steering. In addition, the hitch must be pivoted to permit some weave of the tractor, and still allow the operator to plow a straight furrow. However, with a long hitch, a large amount of headland is necessary for turning at the end of the furrow unless the plow can be close coupled to the tractor. Accordingly, the main objects of the invention are to provide an improved simplified and more effective plow hitch which will so operate as to permit a short turn to the right or left as the tractor is steered to the right or left, and to provide a direct connected plow using the rear tractor wheels respectively as the land wheel and the front furrow wheel and also to provide a stable three point suspension for the plow frame including the rear furrow wheel of the plow.

In the construction of the present invention, the rear wheels of the tractor may be adjusted laterally on the axle to compensate for side draft of the plow. The hitch point of the draw-bar which is placed as near to the center line of the tractor rear axle as possible in order that the rear wheels of the tractor will act as gauge wheels for the height of hitch point, is also made adjustable. Accordingly, another object of the invention is to provide a close coupled construction including a long draw-bar gauged from the axis of the tractor wheels, so that any up and down movement of the front end of the tractor will not affect the plowing depth, the draw-bar being constructed to be normally rigid at all times in vertical and horizontal planes and braced against torsional or lateral tilting movement, but, upon making a short turn at the ends of the headlands, the draw-bar, as the tractor is swung a certain distance to the right or left, may break or fold to permit the operator to make a very short turn with the tractor and the implement, the turning of the tractor automatically releasing a normally rigid coupling or joint on the draw-bar so that it pivots about a vertical axis in the length of the draw-bar.

Another object of the invention is to provide for the raising and lowering of the point where the draft of the tractor is applied to the plow.

Another and more specific object of my invention is to provide a quick detachable connection of the plow hitch and draw-bar to the tractor.

Still another and more specific object is to adapt my invention to a tractor disc plow.

Other objects and advantages will appear in the following description of a preferred embodiment of the invention, as illustrated in the accompanying drawings wherein.

In its present embodiment, the invention is shown in combination with a row crop tractor of the well known tricycle type comprising a wide tread rear axle structure 10 supported on traction wheels 11 adjustably mounted on the rear axles 12 and having a central longitudinal body 13 supported at the front on a dirigible, narrow tread steering truck not shown. The tractor is steered from the operator's station 14 through the necessary mechanism connected to the steering truck and not shown as it is not necessary for the understanding of my invention. Integral with the right and left rear axle housings 15 and 15' are the right and left inner and outer flanges A, A' and B, B' symmetrically placed forming a draft connection, to which various implements are attached, as in this instance, a disc plow of a well known type having the hitch of my invention for connecting it to the tractor.

The tractor disc plow C comprises a main frame beam 16 which extends rearwardly, laterally and rearwardly to the left, then rearwardly, and then rearwardly and laterally to the right. The rear disc plow 17 is adjustably and rotatably supported from the plow beam 16 by the rear disc bearing bracket or standard 18. The disc bearing standard 18 is adjusted by the bolts and clamps 19. Laterally spaced from the front portion of the beam 16 and secured thereto by a V shaped brace 20 is the front frame beam 21 which extends rearwardly and then rearwardly and laterally. Adjustably secured to the laterally extending portion of the plow beam 21 is the front disc bearing bracket or standard 22 on which the front disc plow 23 is rotatably mounted. The standard 22 is adjustably secured by the bolts and clamps 24. Supported from the rear end of the plow beam and adjustably secured thereto is the rear axle bracket 25. The rear axle 26 has a vertical portion 26a slidably mounted in the rear axle bracket 25 to permit the frame of the plow to be vertically adjusted and a laterally and downwardly extending axle portion 26b to which the rear furrow wheel 27 is rotatably secured. The rear axle portion 26b is correctly angled so that the rear furrow wheel 27 may follow the furrow to guide the plow properly. To adjust the rear furrow wheel properly, the upper end of the rear axle 26 has a square portion 26c forced thereon to which a laterally extending U shaped bracket 28 is secured. Pivoted in the U shaped bracket 28 is an adjustable link 29 having a rear link 30 adjustably connected by a turn buckle 31 to a front link 32 pivotally secured to a bracket 33 attached to the plow beam 16. The link 29 may be shortened or lengthened by adjusting the turn buckle 31. When the link is thus adjusted, it radially adjusts the axle so that the rear furrow wheel 27 may better follow the furrow. In order to adjustably support the plow frame in a vertical position, the vertical portion of the rear axle 26 has a collar 34 secured in position thereon as by the pin 35. Journaled on the vertical portion of the rear axle 26, to permit the rear axle 26 to be moved relative to the plow frame and supported vertically by the collar 34, is the frame supporting and spring counterbalance bracket 36. Pivotally supported at the front end of the bracket 36 are two fulcrum links 37 which are pivoted and adjustably connected to the forked arms 38 of the raising and lowering lever 39 through plates 40, having holes 41 for adjusting, securely welded to the forked arms 38, as shown. The lever 39 is vertically adjusted on the adjusting quadrant 42 which is secured to the frame beam 16. The lever 39 extends forwardly to the operator's station and has the usual handle, thumb latch, latch rod and detent. The lever 39 is located in the same vertical plane as the draw-bar so that it will always be in a convenient location whenever the tractor is turned, and also so that it will be in easy operating distance when the plow is in its short turn position if it is necessary to use the lever. Pivotally connected to the rear ends of the forked arms 38 are the raising arms 43 secured to the rear axle bracket 25 by the raising arm bracket 44. The weight of the plow is counterbalanced by the counterbalancing spring 45 adjustably secured at the top by the adjusting rod and nut 46 to the rear portion of an upwardly extending supporting arm 47 secured to the upwardly extending rear portion of the bracket 36. The spring 45 is pivotally secured at the bottom to the forwardly downwardly, and inwardly extending portions 48 of the forked arms 38 of the lever 39. The amount of counter-balance of the spring is adjusted by changing the spring tension through the rod and nut 46. The plow frame is raised by lowering the lever 39 and latching it in adjusted position about the quadrant 42, and the frame is lowered by raising the lever 39, as the plow frame is pivoted at its forward part to the tractor frame. Additional adjustments may be made by changing the fulcrum links 37 in the various holes 41 in the fulcrum bracket 40.

Figures 1, 4, 5:
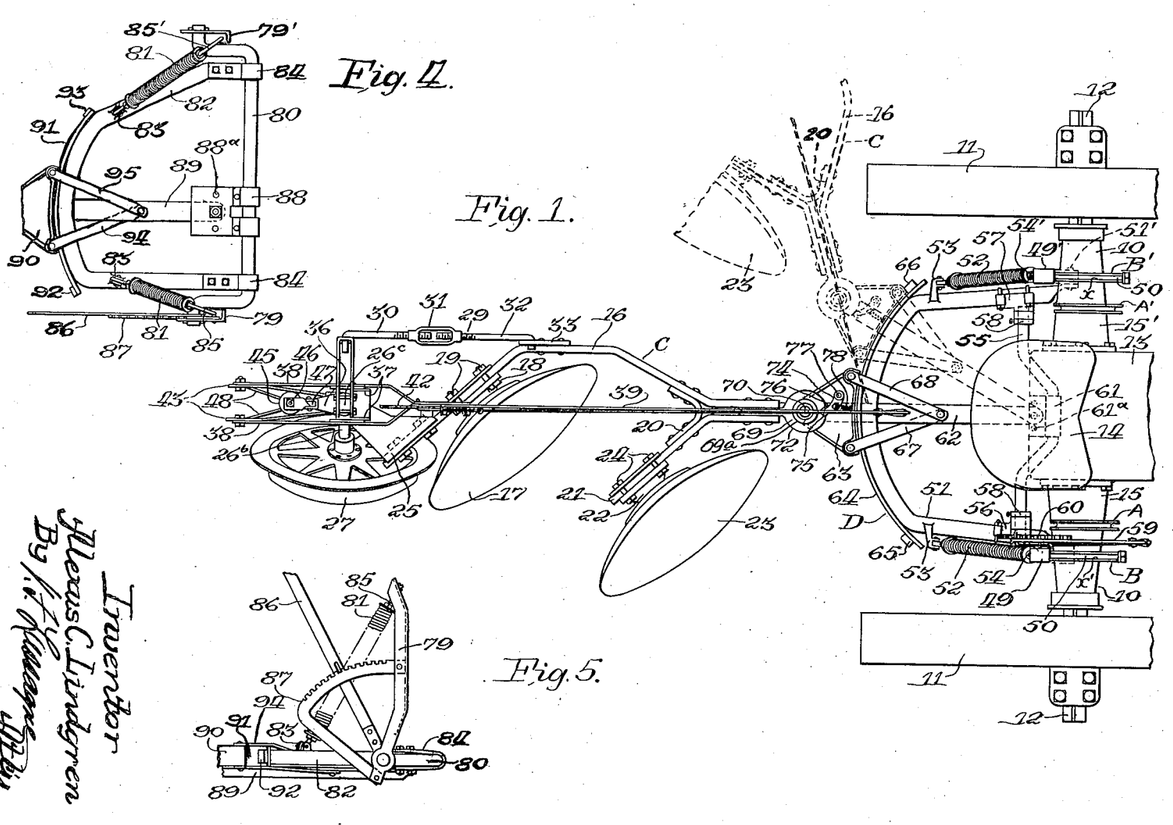
Figure 1 is a plan view of a disc plow attached to the rear end of a tractor by means of my invention, and also showing the hitch in dotted position as the tractor makes a left turn.
Figure 4 is a plan view of a modification of part of the tractor hitch attachment.
Figure 5 is a side elevation of the modification shown in Figure 4.

The disc plow C is rigidly connected vertically to the tractor by my hitch attachment D which is the main object of my invention. The hitch attachment D comprises the right and left draft bail supporting bracket members 49 and 49' which are upright bars having a center portion securely clamped to the vertical rear faces of the outer right and left flanges B and B' by the clamp bolts 50, quickly attached and detached to the flanges B and B' by placing them in the upper and lower grooves $x$ and $x'$ and tightening the nuts against the front faces of the flanges. The lower portions of the supporting members 49 and 49' are inclined forwardly, and at their lower ends the arms of the U shaped draft bail 51 are pivoted thereto at 51'. The bracket members 49 and 49' at their upper ends are inclined rearwardly, and pivoted thereto are the counterbalancing springs 52. At their lower ends, the springs 52 are pivotally connected to the draft bail 51 as by the eye brackets 53 secured thereto. The tension of the springs 52 may be adjusted by the nut and threaded rods 54 and 54' at their upper and lower ends. Extending across the forward end of the draft bail 51 and rotatably mounted thereon is a transverse crank shaped draw-bar connection 55. The pivoted draw-bar or pivoted draft connection 55 is journaled in the right and left bearing supporting brackets 56 and 57 which are secured to the draft bail 51. The draw-bar connection 55 is held in position laterally by the collars and set screws 58. The crank shaped draw-bar connection 55 may be adjusted arcuately in raised and lowered position by the lever 59 extending upwardly to the operator's station 14 and secured at its lower end to the right end of the draw-bar connection 55. The crank portion of the draw-bar connection is located substantially forward under the rear axle of the tractor so that the depth of the tillage tools attached will not be affected by the vertical movement of the front end of the tractor. Likewise, the point of connection of the draft bail is forwardly located under the rear axle for the same reason. The rear tractor wheels also act as gauge wheels for the height of the hitch point. The lever 59 is adjustably mounted about the adjusting quadrant 60 secured to the bracket 56, and secured in adjusted position by the usual detent connected to the thumb latch. The lever 59 provides means on said tractor hitch for vertically adjusting the line of draft of the implement and is used by the operator to adjust the hitch point vertically to vary suction or plowing depth of the tillage tools as various soil conditions are encountered in plowing. The counter-balancing springs 52 aid the operator in overcoming the weight of the draw-bar, as he adjusts the height of the hitch point. Formed about the crank of the draw-bar connection 55, is a pivoted coupling bracket 61 to which the draw-bar 62 is pivotally connected to swing laterally. Holes 61a are provided in the bracket 61 to offset the draw-bar to the right or left as needed. This previously described construction of the bracket 61 provides means for laterally off-setting said draw-bar. The draw-bar 62 passes underneath the draft bail 51 and secured to the rear of the draw-bar is a front release hitch bracket 63 which is shown as a triangular casting or plate arcuately shaped on its forward side to slide about the arcuate guide 64 welded in place on the draft bail 51 which is curved at its rear portion to fit the guide 64. Limiting the lateral movement of the front hitch bracket are the right and left stops 65 and 66 at the respective ends of guide 64. The front hitch bracket 63 is held in horizontal position as it slides about the guide 64 by the upper right and left bracket supporting arms 67 and 68. The arms 67 and 68 are secured at the rear to the front release hitch bracket and at the front to the draw-bar 62 forming a V shaped supporting brace to provide means for bracing said draw-bar against torsional movement about its longitudinal axis.

Pivotally supported on the front hitch bracket 63 is the rear hitch bracket 69 securely fastened to the plow frame between the front ends of the frame beams 16 and 21. The front and rear hitch brackets 63 and 69 form a pivot coupling and are pivotally connected by the vertical draft pin 70 secured in place by the cotter keys 71 at the upper and lower ends. The hitch is rigidly held in place horizontally by means of the long draft pin 70 journaled in long upwardly extending bearing sleeves 69a and 69b on the rear hitch bracket or implement draft coupling 69 and on the front hitch bracket 63. Sufficient bearing surface is thus provided between the vertically spaced upper and lower horizontal flanges 72 and 73 on the rear hitch bracket to prevent tilting when the hitch is released as the tractor is turned in either direction. The front hitch bracket 63 is locked to the rear hitch bracket 69 when the draft bar 62 is in its normal position by a latch arm 74 having a roller 75 which interlocks with a notch 76 on the upper flange 72 of the rear hitch bracket 69. The latch arm 74 is pivotally mounted on a pin 77 secured to the front hitch bracket 63, and the roller 75 is releasably held in the notch 76 by a compression spring 78. When forced out of notch 76, the roller rides on the flange 72. The aforementioned latch arm 74 and its cooperating parts form releasable means on the draw-bar for holding the pivot coupling normally rigid.

It is thus seen that in the embodiment of my invention which has just been described that a normally rigid hitch has been provided for a plow or any implement trailed behind a tractor, where rigidity in the hitch in a vertical plane and in a horizontal plane is needed from the implement through the hitch to the point of draft on the tractor, while at the same time providing for lateral movement of the implement and the tractor relative to each other about a forwardly located point of draft. In addition, a short turn release connection has been provided adjacent the implement which operates only when the tractor has been turned sufficiently to break the hitch connection. Also a hitch attachment has been provided for a tractor having brackets on the axle to which implements of the quick detachable type are attached. With this type of tractor hitch, the operator may quickly detach it from the tractor by unloosening the bolts 50 and drive away from the hitch and implement to attach the tractor to another implement. With this type of hitch attachment, the operator may disconnect the front release hitch bracket from the rear hitch bracket attached to the implement, as in this case the plow, by removing the draft pin 70 and reconnecting the draw-bar to another implement in connection with which the short turn release is desirable.

Figures 2, 3:
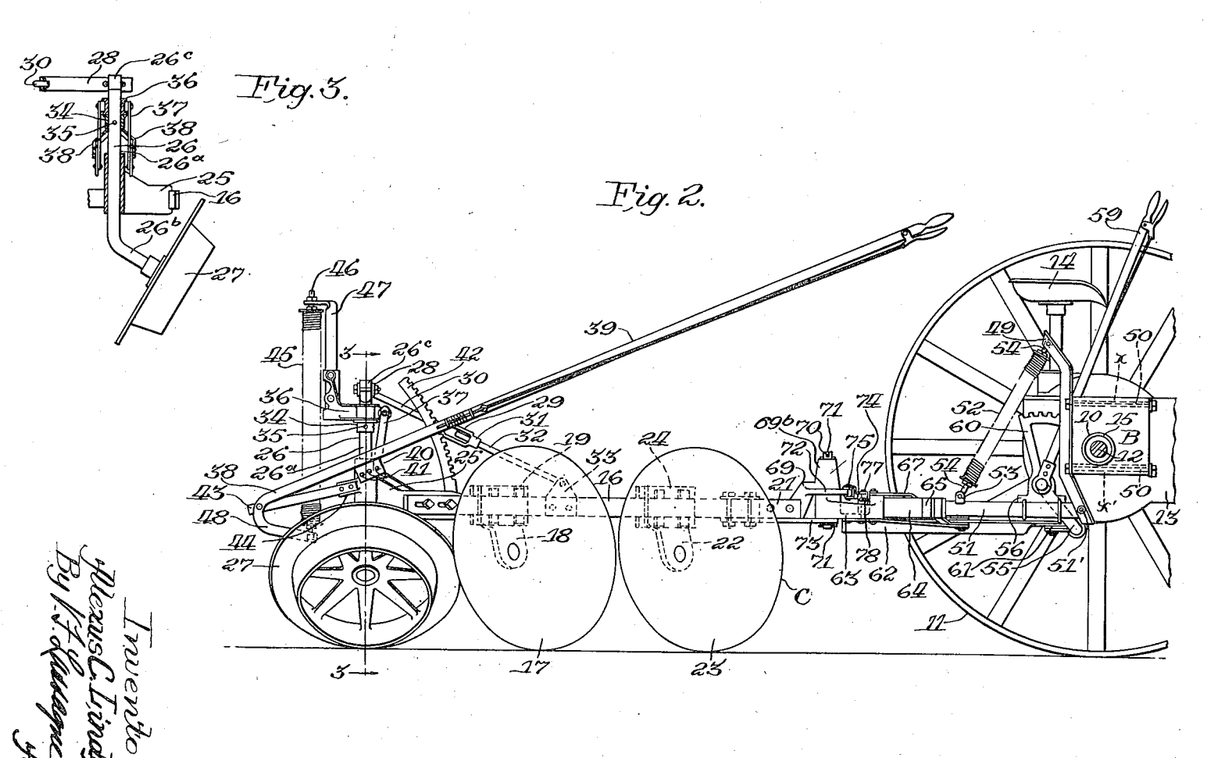
Figure 2 is a vertical view of the disc plow and the rear end of the tractor with the right wheel removed showing my invention in place.
Figure 3 is a fragmentary rear elevational section through 3—3 of Figure 2 in the direction of the arrows.

In the modification of the forward part of the draw-bar attachment as shown in Figures 4 and 5, the parts are similar to those shown in Figures 1 and 2, with the exception that the draw-bar and draft bail are both pivoted to the draw-bar connection in order to adjust both the line of draft of the draw-bar and the draft bail. The modification of the hitch attachment comprises the right and left draft bail supporting bracket members 79 and 79' which are upright bars having a center portion which may be securely clamped to the vertical rear faces of the outer right and left flanges B and B' by the clamp bolts 50 as shown in Figure 1, quickly attached and detached to the flanges B and B' by placing them in the upper and lower grooves x and x' and tightening the nuts against the front faces of the flanges. The lower portions of the supporting members 79 and 79' are inclined rearwardly, and at their lower ends, the arms of the transverse crank shaped draw-bar connection 80 are journaled therein. The bracket members 79 and 79' at their upper ends are inclined rearwardly, and pivoted thereto are the counter-balancing springs 81. At their lower ends the springs 81 are pivotally connected to the draft bail 82 as by the eye brackets 83 secured thereto. The draft bail 82 is pivotally connected to the draw-bar connection by the U-shaped coupling members 84. The tension of the springs may be adjusted by the nut and threaded rods 85 and 85' at their upper and lower ends which are respectively pivoted to the members 79 and 79' and 83. The draw-bar connection 80 is held in position laterally by the cotter keys in the arms extending through the supporting members 79 and 79'. The crank shaped draw-bar connection 80 may be adjusted arcuately in raised and lowered position by the lever 86 extending upwardly to the operator's station 14 and secured at its lower end to the right arm of the draw-bar connection or pivoted draft connection 80. The lever 86 is adjustably mounted about the adjusting quadrant 87 secured to the right hand supporting member 79, as shown, and secured in adjusted position by the usual detent connected to the thumb latch. The lever 86 provides means on said tractor hitch for vertically adjusting the line of draft of the implement and is used by the operator to adjust the line of draft to overcome the suction or to increase the suction of the tillage tools as various soil conditions are encountered in plowing. The counterbalancing springs 52 aid the operator in overcoming the weight of the draw-bar and suction, as he adjusts the line of draft. Formed about the crank of the draw-bar connection 80 is a pivoted coupling bracket 88 to which the draw-bar 89 is pivotally connected to swing laterally. The crank portion of the draw-bar connection to which the draft bail and draw-bar are attached is located substantially forward under the rear axle of the tractor so that the depth of the tillage tools attached will not be affected by the vertical movement of the front end of the tractor. The rear tractor wheels also act as gauge wheels for the height of the hitch point. The coupling bracket 88 is offset from the center line of the tractor and is also provided with holes 88a to offset the draw-bar to the right or left as desired. This construction of the bracket 88 provides means for laterally offsetting said draw-bar. The draw-bar 89 passes underneath the draft bail 82 and secured to the rear of the draw-bar is a front release hitch bracket 90 similar in structure to the bracket 63 shown in Figure 1. The front release hitch bracket 90 is arcuately shaped on its front side to slide about the arcuate guide 91 welded in place to the rear portion of the draft bail 82. Limiting the lateral movement of the front hitch bracket are the right and left stops 92 and 93 on the respective ends of guide 91. The front hitch bracket 90 is held in horizontal position as it slides about the guide 91 by the upper right and left bracket supporting arms 94 and 95. The arms 94 and 95 are secured at the rear to the front release hitch bracket and at the front to the draw-bar 89 forming a V-shaped supporting brace to provide means for bracing said draw-bar against torsional movement about its longitudinal axis. The modification as shown in Figures 4 and 5 has been completely described and the operation and function is the same as set forth in the description of Figures 1 and 2.

Figure 6:
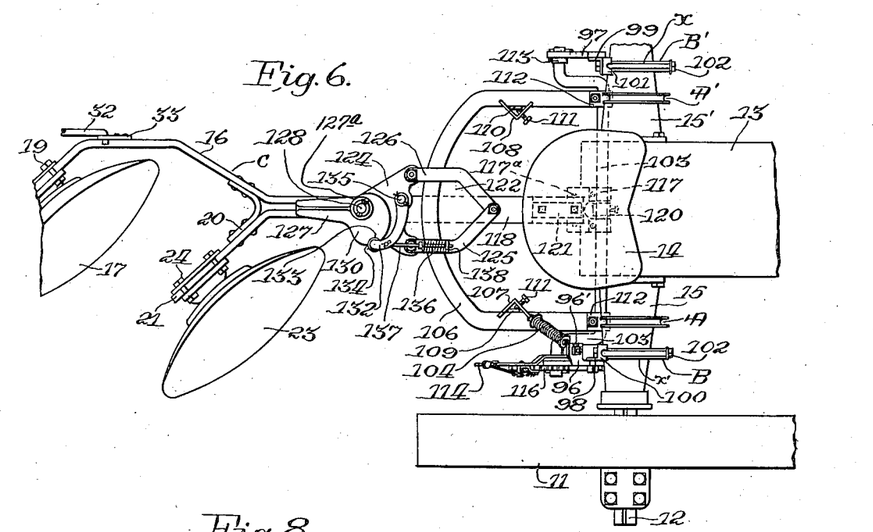
Figure 6 is a plan view of a modification of a tractor hitch attachment similar to that of Figure 4.
Figures 7, 8:
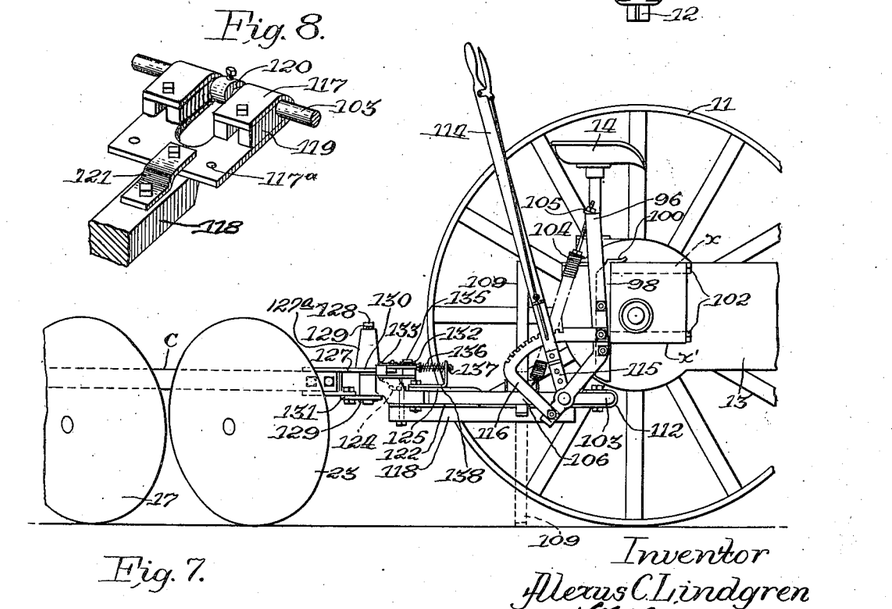
Figure 7 is a side elevation of the modification shown in Figure 6.
Figure 8 is a perspective showing the draw-bar connected to the draw-bar connection.

In the modification of the draw-bar attachment similar to that of Figures 4 and 5 as shown in Figures 6, 7 and 8, the conventional disc plow C and the tricycle tractor as previously described are used and similar reference characters denote the same parts. The modification of the hitch attachment comprises right and left draft bail supporting brackets 96 and 97 secured to right and left quick detachable supports 98 and 99 for a draft connection which have at their upper ends respectively the forwardly extending supports 100 and 101 for aiding in positioning the draw-bar attachment while the clamp bolts 102 are secured to the flanges B and B', as shown. The draft bail supporting bracket members 96 and 97 are upright bars having a center portion secured to the rearwardly extending leg of the quick detachable supports 98 and 99 which are formed from angle bars. The members 98 and 99 are quickly attached and detached to the flanges B and B' by placing the clamp bolts 102 in the upper and lower grooves x and x' and drawing up the nuts against the front faces of the flanges. The lower portions of the supporting members 96 and 97 are inclined rearwardly; and, at their lower ends, the arms of the transverse crank shaped draw-bar connection or pivoted draft connection 103 are journaled therein. The bracket member 96 at its upper end is bent inwardly and tipped forwardly, and suspended therefrom is the counter-balancing spring 104 adjustably attached to the adjusting screw 105 for adjusting the tension of the spring supported from the bracket member 96 in a slotted detaching hole 96'. At its lower end, the spring 104 is pivotally connected to the draft bail 106 by the right stop member 107 which is welded to the draft bail. The right and left stop members 107 and 108 also act as guide brackets for the right and left supporting legs 109 and 110 when the hitch attachment is detached from the tractor. The supporting legs 109 and 110 are securely held in their raised or lowered positions by the set screws 111. The draft bail 106 is pivotally connected to the draw-bar connection 103 by the U-shaped coupling members 112. The draw-bar connection 103 is held in position laterally by the cotter keys in the arms extending through the supporting members 96 and 97 and the adjusting collar 113. The crank shaped draw-bar connection 103 may be adjusted arcuately in raised and lowered position by the lever 114 extending upwardly to the operator's station 14 and secured at its lower end to the right arm of the draw-bar connection 103 by a rearwardly extending crank arm 115 which is welded to the draw-bar connection. The lever 114 provides means on said tractor hitch for vertically adjusting the line of draft of the implement and is adjustably mounted about the adjusting quadrant 116 secured to the right hand supporting member 96, as shown, and secured in adjusted position by the usual detent connected to the thumb latch. Formed about the crank of the draw-bar connection 103 is a pivoted coupling bracket 117 to which the draw-bar 118 is pivotally connected to swing laterally, best shown in Figure 8. The coupling bracket 117 has two looped portions and rear bearing spacers 119 secured therein. The coupling bracket 117 is held in laterally adjusted position on the draw-bar connection 103 by the adjusting collar 120. The coupling bracket 117 is mounted on the center line of the tractor and is also provided with holes 117a to offset the draw-bar 118 to the right or left as desired. This construction of the bracket 117 provides means for laterally off-setting said draw-bar. The coupling bracket 117 is pivotally secured between the draw-bar 118 and the draw-bar clevis strap 121. The draw-bar 118 passes underneath the draft bail 106, and secured to the top of the draw-bar is a wide wear plate 122 so that lateral stability may be given to the plow to prevent its tipping to one side or the other. Secured to the rear of the draw-bar 118 and to the rear portion of the wear plate 122 is a front release hitch bracket 124, similar in structure to the brackets 63 and 90, best shown in Figures 1 and 4, but spaced from the rear portion of the draft bail 106 as shown in Figure 6. Limiting the lateral movement of the front hitch bracket are the right and left stops 107 and 108, respectively, on the right and left legs of the U shaped draft bail 106. The front hitch bracket 124 is held in its horizontal position as it slides on the wear plate 122 by the upper right and left bracket supporting arms shaped to conform to the configuration of the wide wear plate 122. The arms 125 and 126, respectively, are secured at the rear to the front release hitch bracket 124 and at the front to the top of the draw-bar 118. Pivotally supported on the front hitch bracket 124 is the rear hitch bracket 127 or draft connection for the tractor drawn implement securely fastened to the plow frame between the ends of the frame beams 16 and 21. The front and rear hitch brackets 124 and 127 form a pivot coupling and are pivotally connected by the vertical draft pin 128 secured in place by the cotter keys 129 at the upper and lower ends. The hitch is rigidly held in place horizontally by means of the long draft pin 128 journaled in the long upwardly extending bearing sleeve 127a on the rear hitch bracket 127. The members 122, 125, and 126 provide means for bracing said draw-bar against torsional movement about its longitudinal axis. Sufficient bearing surface is provided by the vertically spaced upper and lower horizontal flanges 130 and 131 on the rear hitch bracket to prevent tilting when the hitch is released as the tractor is turned in either direction. The lower flange 131 is in the nature of a replaceable wear plate. The front hitch bracket 124 is locked to the rear hitch bracket 127 when the draft bar 118 is in its normal position by a latch arm 132 having a roller 133 spaced therein which interlocks with a notch in the upper flange 130 of the rear hitch bracket 69. The latch arm 132 is pivotally mounted on a stud pin 135 secured to the front hitch bracket 124, and the roller 133 is releasably held in the notch 134 by the compression spring 136 supported on an adjusting rod 137 pivotally connected to the latch arm 132 and slidably mounted in a supporting bracket member 138 secured to the right supporting arm 125. The notch and latching roller in this modification have been offset to one side to provide for sufficient toggle action to break the hitch when a short turn is made. As the tractor makes a short turn to the right or the left, the roller rides on the cam shaped edge portion of the upper flange 130. The aforementioned latch arm 132 and its cooperating parts form a releasable means on the draw-bar for holding the pivot coupling normally rigid.

It is thus seen that in the embodiment of my invention which has just been described that a normally rigid hitch has been provided for a plow or any implement trailed behind a tractor, when rigidity in the hitch in a vertical plane and in a horizontal plane is needed from the implement through the hitch to the point of draft on the tractor, while at the same time providing for lateral movement of the implement and the tractor relative to each other about a forwardly located point of draft. In addition, a short turn release connection has been provided adjacent the implement which operates only when the tractor has been turned sufficiently to break the hitch connection. In the short turn position, with the latch released, the counter-balancing spring 104 prevents the hitch from sagging. When the hitch is latched in its normal trailing position, the spring 104 aids in counterbalancing the weight of the draw-bar as the operator manually adjusts the hitch point with the lever 114 to adjust the plowing depth of the plow as different soil conditions are encountered. Also a hitch attachment has been provided for a tractor having brackets on the axle to which implements of the quick detachable type are attached. With this type of tractor hitch, the operator may quickly detach it from the tractor by lowering the supporting legs 109 and 110 and locking them in position, detaching the spring 104 by loosening the adjusting rod 105 and sliding it from the notch 96', then unloosening the bolts 50 and swinging the members 96 and 97 to the rear out of way about the drawbar connection 103 to which they are pivoted, and drive away from the hitch and implement to attach the tractor to another implement. With this type of hitch attachment, the operator may disconnect the front release hitch bracket from the rear hitch bracket attached to the implement, as in this case the plow frame may be lifted from the draft pin 128 and disconnected and the drawbar may then be coupled to another implement in connection with which the short turn release is desirable.

In the operation of the plow, the operator, having set his rear furrow wheel correctly by adjusting the turnbuckle, adjusts for the depth of furrow by operating the lever 39 from the seat. When the lever 39 is operated, the plow frame pivots about the pivot point 51'. The hitch attachment D provides a rigid connection from the pivot point 51', through the hitch and to the implement frame. The point of draft of the hitch may be adjusted through the lever 59 extending to the operator's station. When the operator reaches the end of the field with an ordinary hitch, a wide turn is necessary after the plow or other soil engaging device has been raised; but with the present invention, as the operator turns his tractor to the right or left the tractor is turned relatively to the implement or plow about the point of connection of the draw-bar 62 to hitch bracket 61. If the tractor is finally turned so short that the draw-bar is stopped by either the stops 65 or 66 of Figure 1, 107, 108 of Figure 6, or 92 and 93 of Figure 4, which form, with the releasable means or latch mechanism 74 of Figure 1 or 132 of Figure 6 and their cooperating members, means for releasing the pivot coupling, depending upon the direction in which the tractor is turned, the force of the turning becomes sufficient to release the latch 74 permitting the drawbar then to pivot or fold on the draft pin 70. The operator having completed the turn and straightened up the tractor and implement, the draw-bar 62 centers itself automatically and the latch 74, automatically through the spring pressure, latches the front and rear hitch brackets securely together so that a rigid hitch is provided directly from the forward pivot point on the tractor through the hitch attachment to the trailed implement.

The operation of the modification of the hitch attachment as shown in Figures 4 and 5 is the same as that described for the attachment shown in Figures 1 and 2. The exception is that in adjusting the point of draft of the attachment the draft bail and draw-bar are pivoted together by the operation of the lever 86.

The operation of the modification of the hitch attachment as shown in Figures 6, 7 and 8 is the same as that of Figures 4 and 5. The distinction is that no separate guide plate is provided on the front release hitch bracket. The wide wear plate 122 and braces 125 and 126 act to give the necessary rigidity to the hitch thereby doing away with the necessity of a guide to stabilize the hitch. The wear plate and braces also act to counteract any torsional stress about the longitudinal axis of the draw-bar caused by the plow. As the hitch swings to the right or left the stops 107 and 108 perform the same function to release the latch on the front release hitch bracket allowing the short turn as previously described. The stops 107 and 108 also provide the additional function of guides for the supporting standards.

It will be evident that there has been provided an attachment which may be readily connected to and disconnected from the tractor for subsequent attaching of other tractor mounted implement attachments, and also a hitch attachment which may be always secured to the tractor and connected to various implements where it is desirous to have a short turn release that may be attached thereto.

The preferred embodiment of the invention herein described is capable of certain modifications without departure from the scope of the invention to be defined in the following claims.

What is claimed is:

1. The combination with a tractor having a draft connection, and a tractor drawn implement, of a hitch comprising a draw-bar and pivot coupling connected to the implement, means for connecting said draw-bar to said tractor draft connection, releasable means on the draw-bar for holding the pivot coupling normally rigid, means providing for lateral swinging movement of said drawbar, and means on said hitch for releasing the coupling and allowing a short turn of said tractor relative to said tractor drawn implement.

2. The combination with a tractor having a draft connection, and a tractor drawn implement, of a hitch comprising a drawbar and pivot coupling connected to the implement, means for connecting said drawbar to said tractor draft connection, releasable means on the draw-bar for holding the pivot coupling normally rigid, means for adjusting the point of draft of said draw-bar, means providing for lateral swinging movement of said drawbar, stop means on said hitch for limiting the lateral swinging movement of said drawbar in either direction, and said releasable means on said drawbar operable when limited by said stop means for releasing the coupling and allowing a short turn of said tractor relative to said tractor drawn implement.

3. The combination with a tractor having a draft connection, and a tractor drawn implement, of a hitch comprising a drawbar connected to the implement, means for connecting said drawbar to said tractor draft connection, means providing for lateral swinging movement of said drawbar, short turn means on said drawbar comprising a vertical pivot coupling for allowing a short turn of said tractor relative to said tractor drawn implement, latch mechanism on the drawbar normally holding said pivot locked, and means for releasing said latch mechanism when a predetermined angle is attained between the tractor and the implement when turning.

4. The combination with a tractor having a draft connection, and a tractor drawn implement, of a hitch comprising a draft bail, means for pivoting said draft bail to said tractor, a drawbar pivotally connected to said draft bail and connected to the implement by a normally locked vertical pivot, means providing for lateral swinging of said drawbar relative to said draft bail, and means on said drawbar adapted for releasing said pivot and allowing a short turn of said tractor relative to said tractor drawn implement.

5. The combination with a tractor having a draft connection, and a tractor drawn implement, of a hitch comprising a vertically adjustable draft bail, a drawbar connecting the implement to the draft bail, means for laterally adjusting said drawbar, means providing for lateral swinging of said drawbar relative to said draft bail, arcuate means on said draft bail for guiding said drawbar, and means on said drawbar for allowing a short turn of said tractor relative to said tractor drawn implement.

6. The combination with a tractor having a draft connection, and a tractor drawn implement, of a hitch comprising a vertically movable draft bail, means for vertically adjusting said draft bail, a drawbar connecting the implement to the draft bail, means for vertically adjusting said drawbar relative to the tractor, means providing for lateral swinging of said drawbar relative to said draft bail, and means on said drawbar for allowing a short turn of said tractor relative to said tractor drawn implement.

7. The combination with a tractor having a draft connection, and a tractor drawn implement, of a hitch comprising a draft bail, a drawbar connecting the implement to the draft bail, means providing for lateral swinging of said drawbar relative to said draft bail, arcuate means on said draft bail for guiding said drawbar, stop means on the draft bail for limiting the lateral swinging movement of said drawbar in either direction, and means on said drawbar comprising a yieldable but normally rigid pivot coupling operable when limited by said stop means for allowing a short turn of said tractor relative to said tractor drawn implement.

8. The combination with a tractor having a draft connection, and a tractor drawn implement, of a hitch comprising a draft bail, means for pivoting said draft bail to said tractor, a drawbar pivotally connected to said draft bail, means providing for lateral swinging of said drawbar, means on said drawbar for pivotally connecting said drawbar to said implement, means for normally latching said pivotal connection with the implement to provide a rigid hitch, and means operated by the turning of the tractor for releasing said latch means when a short turn of the tractor is made relative to the tractor drawn implement.

9. The combination with a tractor having a draft connection, and a tractor drawn implement having a draft connection, of a hitch comprising a drawbar normally rigid in a vertical plane for connecting said implement to said tractor draft connection, means providing for lateral swinging movement of said drawbar, means on said drawbar for allowing a short turn of said tractor relative to said tractor drawn implement comprising normally locked pivotal means for connecting said drawbar to said draft connection on said implement, and means for releasing the aforesaid normally locked pivoted means.

10. The combination with a tractor having a pivoted draft connection and means for supporting said draft connection from said tractor, and a tractor drawn implement having a draft connection, of a hitch comprising a drawbar normally rigid in a vertical plane for connecting said implement to said tractor draft connection, means providing for lateral swinging movement of said drawbar, means on said drawbar for allowing a short turn of said tractor relative to said tractor drawn implement, and resilient means for supporting said tractor hitch from the aforesaid supporting means.

11. A tractor hitch attachment for a tractor comprising, a draft connection, a support for the draft connection, means for quickly attaching and detaching said support to the tractor, a draft bail pivoted to said draft connection, a drawbar, means providing for lateral swinging movement of said drawbar, means for laterally offsetting said drawbar, cooperating short turn release means on said drawbar and said draft bail for allowing a short turn of said tractor comprising latching means for automatically releasing and locking said drawbar as said tractor is turned or straightened away, and resilient means for adjustably supporting said draft bail from the aforesaid support.

12. The combination with a tractor having a rear axle and wheels mounted thereon and a draft connection located substantially in the vertical plane of said axle, and a tractor drawn implement, of a tractor hitch comprising a draft bail, means for vertically adjusting said draft bail, a drawbar connecting the implement to the draft bail, means for vertically adjusting said drawbar where it connects said implement to the draft connection substantially on the vertical plane of said rear axle whereby said rear wheels serve to gauge the height of the point of draft, means providing for lateral swinging of said drawbar relative to said draft bail, and means on said drawbar for allowing a short turn of said tractor relative to said tractor drawn implement.

13. The combination with a tractor having a rear axle and wheels mounted thereon, and a draft connection, of a plow having a rear furrow wheel, the rear wheels of said tractor respectively serving as the land and front furrow wheels of said plow when in operating position, a tractor hitch for said plow comprising a long drawbar normally rigid in a vertical plane extending through said implement frame and to where said drawbar is pivoted to said tractor draft connection, means providing for lateral swinging movement of said drawbar and implement as a unit, and means on said drawbar for allowing a short turn of said tractor relative to said tractor drawn implement comprising a releasable lock-joint between the drawbar and the implement.

14. The combination with a tractor having a rear axle and wheels mounted thereon and a draft connection, of a direct connected plow having a rear furrow wheel, the rear wheels of said tractor respectively serving as the land and front furrow wheels of said plow when in operating position, a hitch for said plow comprising a long drawbar normally rigid in vertical and horizontal planes extending through said plow to where said drawbar is pivoted to said tractor draft connection, means providing for lateral swinging movement of said drawbar and plow as a unit, and means on said drawbar for allowing a short turn of said tractor relative to said tractor drawn plow comprising a releasable lock-joint having an elongated vertical pivot, whereby said tractor hitch will remain rigid in the aforesaid horizontal plane.

15. In the combination set forth in claim 14, said tractor hitch comprising a draft bail and the aforesaid drawbar, means for pivotally supporting said draw-bar and draft bail substantially in a vertical plane through the rear axle, and quick detachable means for attaching said tractor hitch to the aforesaid tractor.

16. In the combination set forth in claim 14, said tractor hitch comprising a draft bail and the aforesaid drawbar, means for pivotally supporting said drawbar and draft bail underneath the rear axle of the tractor whereby the rear wheels of the tractor gauge the point of draft connection, means on said draft bail for releasing the lock-joint for allowing a short turn, means for simultaneously adjusting the draft point of said drawbar and the draft bail, and adjusting means on said plow for adjusting said plow vertically about said tractor draft connection.

17. In the combination set forth in claim 14, said tractor hitch comprising a draft bail and the aforesaid drawbar, means for pivotally supporting said drawbar and draft bail, means on said draft bail for releasing the lock-joint for allowing a short turn, means for adjusting the draft point of said drawbar and the draft bail, quick detachable means for attaching and detaching said tractor hitch to the aforesaid tractor, and means for supporting said tractor hitch in detached position.

18. In the combination set forth in claim 14, said tractor hitch comprising a draft bail and the aforesaid drawbar, means for pivotally supporting said drawbar and draft bail, means for guiding said drawbar on said draft bail, means on the drawbar engaging the draft bail at laterally spaced points to brace the drawbar against movement about its longitudinal axis, means for adjusting the draft point of said drawbar and the draft bail, quick detachable means for attaching and detaching said tractor hitch to the aforesaid tractor, and means on said plow for adjusting said plow vertically about said tractor draft connection.

19. The combination with a tractor having a vertically adjustable draft connection, and a tractor drawn implement, of a tractor hitch comprising a draw-bar and pivot coupling connecting said implement to said tractor draft connection and pivotally mounted thereon, releasable means on the draw-bar for holding the pivot coupling normally rigid, means providing for lateral swinging movement of said draw-bar, means on said draw-bar for releasing the coupling and allowing a short turn of said tractor relative to said tractor drawn implement, means on the implement for raising and lowering it whereby said implement may be pivotally adjusted vertically about said adjustable draw-bar connection, and means on said tractor hitch for vertically adjusting the line of draft of said implement by adjusting said draft connection.

20. The combination with a tractor having a pivoted draft connection and means for mounting said draft connection on said tractor, and a tractor drawn implement, of a tractor hitch comprising a drawbar connected to said tractor draft connection, a support for the draw-bar, means providing for lateral swinging movement of said draw-bar on said support, and adjustable resilient means for supporting said draw-bar support from the aforesaid mounting means.

21. The combination with a tractor having a rear axle and wheels mounted thereon and a draft connection located between said wheels, of an implement having a frame having a ground engaging support at its rear end, a tractor hitch for said implement comprising a draw-bar normally rigidly attached to said implement frame and pivotally connected to the draft connection whereby the draw-bar and the implement frame may swing laterally as a unit, short turn means including a normally rigid but releasable joint on said draw-bar intermediate the tractor draft connection and the implement, and means for releasing said joint at a predetermined angular position of said draw-bar during a turn.

22. The combination with a tractor having a rear axle and wheels mounted thereon and a draft connection between said wheels, of a plow frame having a rear furrow wheel, the rear wheels of said tractor being spaced to constitute respectively the front land and furrow wheels of said plow when in operating position, a tractor hitch for said plow frame comprising a draw-bar normally rigidly attached to said plow frame and pivotally connected to the draft connection whereby the draw-bar and the plow frame may swing laterally as a unit, short turn means including a normally rigid but releasable joint on said draw-bar intermediate the tractor draft connection and the plow, and means for releasing said joint at a predetermined angular position of said draw-bar during a turn.

23. A hitch attachment for a tractor comprising supporting means, a draft connection having a transversely extended member pivoted to the supporting means on a horizontal axis, quick detachable means for mounting said supporting means on the tractor, a draft bail pivoted to said transversely extended member for vertical movement, a draw-bar pivoted on the draft connection for lateral swinging movement, means for adjusting said draft connection vertically about its horizontal axis, and means for guiding said draw-bar on said draft bail and supporting it thereon.

24. A hitch attachment for a tractor comprising a draft connection, supporting means for said draft connection, said draft connection comprising a transversely extended member having an intermediate eccentric portion and having its ends pivoted about a horizontal axis on the supporting means, a draft bail and a draw-bar pivoted to said eccentric portion of the draft connection for vertical movement, means for pivotally mounting said draw-bar on said draft connection for a lateral swinging movement on said draft bail, means for slidably supporting said draw-bar on said draft bail, means for adjusting said draft connection about its horizontal axis, and resilient means for supporting said draft bail from the aforesaid supporting means.

25. The combination with an implement frame supported by ground engaging members, of a hitch attachment comprising a draw-bar, short turn release mechanism connecting said implement frame to said draw-bar, a draft bail slidably connected to said draw-bar, a draft member to which said draw-bar and said draft bail are pivotally attached, supporting means for said draft member adapted to be coupled to a tractor axle whereby said implement frame will be directly connected to a tractor, and adjustable ground engaging means for supporting said draft bail mounted thereon whereby said implement frame and hitch attachment may be supported when detached from the tractor in position for subsequent attaching.

ALEXUS C. LINDGREN.